Jan. 19, 1932.  I. TRAUTMAN  1,842,219
AUTOMOBILE TIRE AND WHEEL AND MEANS AND METHOD OF MAKING THE SAME
Filed April 22, 1929   2 Sheets-Sheet 1

INVENTOR
Ira Trautman
ATTORNEY

Jan. 19, 1932.   I. TRAUTMAN   1,842,219
AUTOMOBILE TIRE AND WHEEL AND MEANS AND METHOD OF MAKING THE SAME
Filed April 22, 1929   2 Sheets-Sheet 2
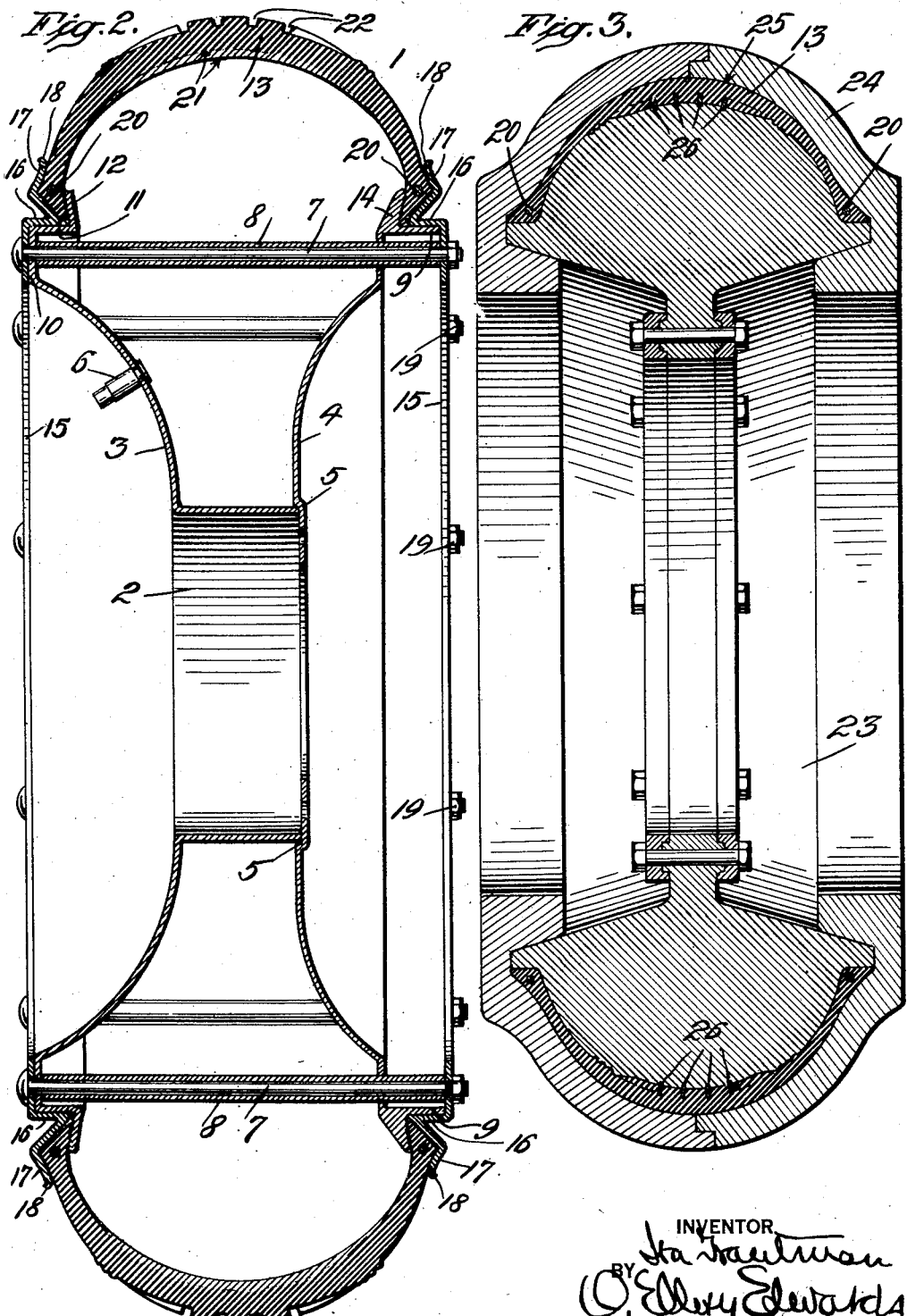
INVENTOR
Ira Trautman
BY
O. Ellery Edwards
ATTORNEY Patented Jan. 19, 1932

1,842,219

UNITED STATES PATENT OFFICE

IRA TRAUTMAN, OF FREEPORT, NEW YORK, ASSIGNOR TO AIR SEALED TIRE CORPORATION, OF NEW YORK, N. Y., A CORPORATION OF NEW YORK

AUTOMOBILE TIRE AND WHEEL AND MEANS AND METHOD OF MAKING THE SAME

Application filed April 22, 1929. Serial No. 356,911.

The main object of my invention is to make an automobile tire and wheel without an inner tube which will have a very large air chamber and therefore ride easily and a further object is to provide a tire which will be self-healing when punctured. These and other objects are accomplished by my invention, one embodiment of which is herein after more particularly set forth.

For a more detailed description of my invention, reference is to be had to the accompanying drawings, forming a part hereof, in which Figure 1 is a side elevation of a wheel provided with my improvements.

Figure 2 is a transverse section of the same.

Figure 3 is a cross section of a core and mould with my improved tire between them, thereby showing the means by which this tire is made.

Throughout the various views of the drawings, similar reference characters designate similar parts.

Figure 1:
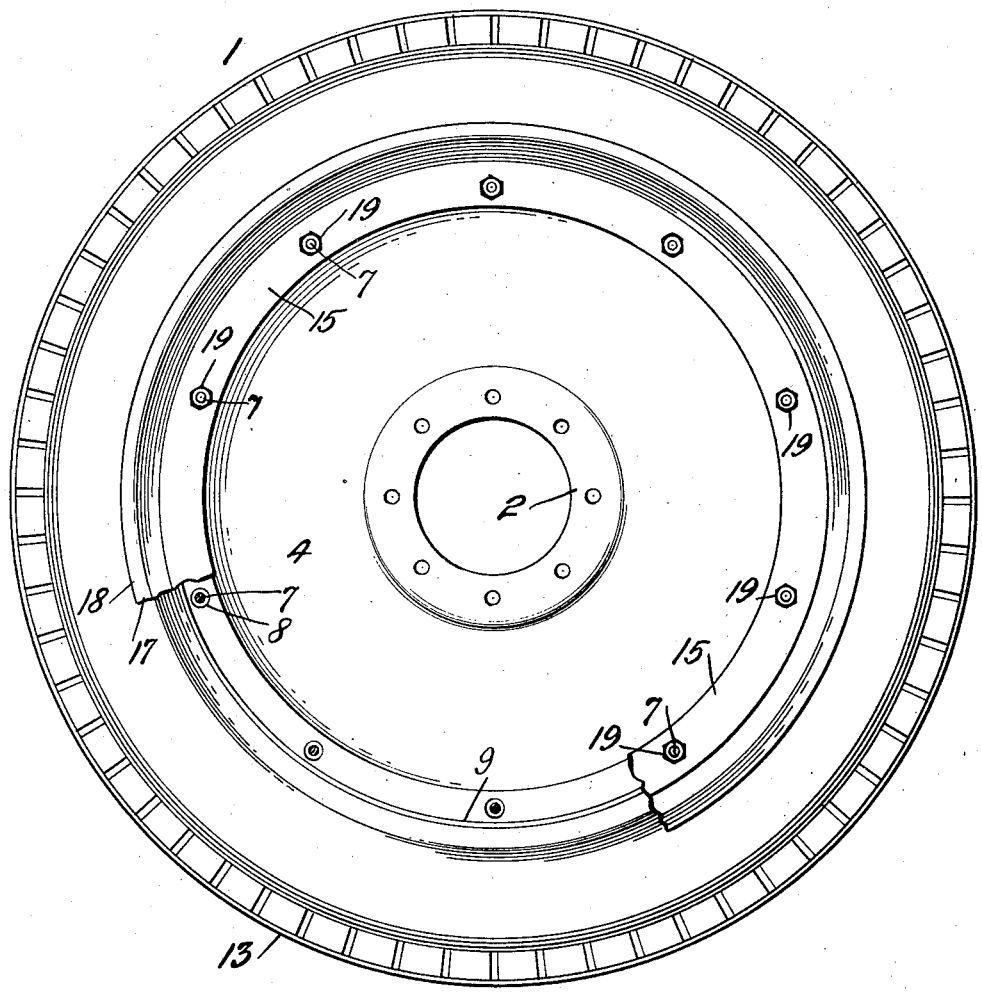

My improved wheel 1 has a hub 2 of any suitable kind and extending from this hub are the opposed discs 3 and 4. In the embodiment shown, the hub 2 and disc 3 are made integral and the disc 4 is suitably recessed so as to fit snugly against the hub 2, as shown at 5. To make a tight joint it is generally necessary to weld the parts 2 and 4 together and at times to prevent leakage, it is desirable to form a rust joint by immersing the wheel in brine for a few hours, whereby microscopic air leaks may be stopped. At any convenient location, an air valve may be inserted, as indicated at 6 in Figure 2.

For a purpose that will be described below, it is necessary to use tie bolts 7, or their equivalent, and these pass through both the discs 3 and 4, but do not enter the chamber between them because these tie bolts are surrounded by tubes 8 which pass from the inner surface of the disc 3 and through the disc 4 to the plane of the edge of the outer flange 9 for a purpose that will appear below. At this point, it is sufficient to say that the tubes 8 have an air tight connection with the discs 3 and 4 so that no leakage of air will occur between these parts.

The disc 3 is outwardly extended at 10 to have a surface parallel with the plane perpendicular to the axis of the wheel and beyond this and beyond the tube 8 is a cylindrical surface 11 which runs inwardly towards the disc 4 and thence is a collar 12 which runs at an inclination and outwardly so as to complete the disc 3 and form an inner bearing for the tire 13 which will be described below. In a similar manner, the disc 4 is projected to form the collar 9 which has been described above and at the inner edge of this collar is provided a flange 14 similar to the flange 12 and which projects in the same way with its inner edge flared outwardly at a slight inclination for a purpose that will appear below.

The bolts 7 which pass through the sleeves 8 also pass through identical clamping collars 15, each of which is annular in form and perforated to receive the bolts 7 and provided at its outer periphery with a cylindrical portion 16 which fits over the collar 9 or the cylinder 11 and beyond this is an outwardly splayed V portion 17 which is shaped substantially as shown in Figure 2 with a curled outer edge 18 which will protect the tire 13 in a manner described below.

When the parts are assembled, as shown, the tire 13 has its heels firmly clamped between the projections 12 and 14 on its interior and the grooved parts 17 on its exterior and the nuts 19 of the bolts 7 are tightened so as to firmly bind together the clamping rings 15 and the discs 3 and 4 and form an air tight joint at the heels of the tire 13. These heels are provided with the usual wire cable 20 which is inserted in the tire 13 in the usual manner.

It will be noted that the air chamber bounded by the hub 2, discs 3 and 4 and tire 13 is a very large chamber, a much larger chamber than is possible with an ordinary pneumatic tire and because of the largeness of this chamber, it is possible to let the wheel function with a much lower air pressure than is customarily employed in pneumatic tires for automobiles. This results in a much safer and easier riding car because the ground is better gripped by the tire and the car is better supported with a softer cushion and unequalities in the ground over which the automobile passes causes less vibration. The interior of the tire 13 is provided with an additional layer of gum 21 vulcanized nearly pure so that if the tire be perforated it will be self-healing for all but very large cuts. Actual experience has shown that when the tire is so constructed it can be perforated by a twenty penny nail which can be withdrawn without in any manner causing a leak. The exterior of the tire or tread has longitudinal grooves 22 which are important for a reason that will appear below.

The heels of the tire 13 are preferably roughened to a slight degree, as indicated, and so are the opposing surfaces of the parts 17, 12 and 14, whereby an air tight joint is assured at all times.

When a load is put on the wheel, under the normal conditions of service, the tire 13 is somewhat flattened and then adjacent to the heels the exterior of this tire engages the edges 18 which are so shaped as to avoid abrasion and prevent the tire from being rim cut. The grooves 22 remove all unnecessary tension from the rubber which might otherwise exist in view of the peculiar manner in which it is vulcanized, as will appear below. It is to be noted that the tie bolts 7 bind the clamping rings 15, discs 3 and 4 and tire 13 firmly together and in perfect equilibrium so as to prevent all undue strain on any of the parts and prevent collapsing or spreading. For this reason, they are employed in the preferred embodiment of my invention. If desired, the tubes 8 can be done away with and studs projected from the plates 3 and 4, but this would be an inferior construction because the normal tendency of use would be to spread the plates and destroy the wheel. A very slight deflection of the discs 3 and 4 is liable to cause a leak and for this reason absolute rigidity is most desirable. Such is secured by means of the structure above described.

The tire which has been described above is made in a particular manner which will now be set forth. This tire, like all tires, is made between a core 23 and a mould 24. The core 23 and mould 24 are normal except for special features which will be described below and so it is not necessary to describe the means for collapsing the core 23 or the means for holding the parts of the mould 24 in proper relation during the process of vulcanization. These are as usual and so is the vulcanizing chamber in which the tire is vulcanized. This core and this mould do, however, differ from the ordinary in two respects. The mould 24 has a smooth surface 25 and the core 23 has a surface roughened to correspond to the finished tire 13 at its tread portion and to secure the grooves 22 this core is provided with the ridges 26 which are carefully held in place together with the other projecting and recessed parts necessary for the proper vulcanization of the tire 13. This tire 13 is made up in the conventional manner, except that the exterior 25 is soft and almost pure gum and the interior, near the ribs 26, is made in the conventional manner, and between the two are laid the cords or canvas, as desired, in the conventional way, and the cables 20 are laid in the usual way. This tire, when so placed in the moulds, is vulcanized in the usual way and when so vulcanized it is vulcanized in the reverse condition from that which it occupies when in use. When properly vulcanized, it is removed from the mould and core in the usual manner and then reversed and then it is ready to go into the metal parts of the wheel above described.

The tire, when made and assembled as above described, is used on a wheel of the kind set forth without any pneumatic tube of any kind and with the very satisfactory results above mentioned. Obviously, as long as no inner tube is required no flap is required between the metallic parts and the tire which is an additional advantage.

While I have shown and described one embodiment of my invention, it is obvious that it is not restricted thereto, but that it is broad enough to cover all structures that come within the scope of the annexed claims.

Having thus described my invention, what I claim is:

1. In a vehicle wheel of the character described, the combination with a wheel hub, of a pair of spaced disc members extending radially therefrom and having an air-tight connection therewith and forming a portion of an air chamber, a pair of angularly arranged horizontal and vertical circumferential flanges integrally formed on the outer edge of each of said disc members, a resilient tire positioned on said disc members with its heels in contact with said flanges and forming a part of said air chamber, the outsides of said heels being of angular formation, clamping rings in direct contact with said horizontal flanges and having an angularly arranged portion in circumferential contact with the outer sides of said tire heels, and means extending through said disc members and rings for securing said clamping rings, tire heels and flanges in fixed and air-tight relation.

2. A vehicle wheel of the character described comprising a hub, a pair of spaced disc members having an air tight connection with and extending radially from said hub and forming a portion of an air chamber, a pair of angularly arranged circumferential flanges on each of said disc members, a clamping ring contacting with and fitting over the outer edge of one of said circumferential flanges of each disc member and having an outwardly splayed V-shaped edge portion extending beyond said disc member flange with which said ring contacts and spaced from the other flange of said disc member, and means extending transversely through said disc members and clamping rings below said flanges for securing said parts together, said last mentioned means having an air-tight connection with said disc members.

3. A vehicle wheel of the character described comprising a pair of spaced disc members, one of which has a central portion bent to form a wheel hub, the ends of said bent portion having an air-tight connection with said other disc member, integrally formed outer disc portions extending radially from said hub and forming a portion of an air chamber, a pair of angularly arranged circumferential flanges on each of said disc members, a clamping ring contacting with and fitting over the outer edge of one of said circumferential flanges of each disc member and having an outwardly splayed V-shaped edge portion extending beyond said disc member flange, and means extending transversely through said disc members and clamping rings for securing said parts together.

In testimony whereof, I have hereunto set my hand this 13th day of April, 1929.

IRA TRAUTMAN.